US012806558B2

(12) United States Patent
Roesner et al.

(10) Patent No.: US 12,806,558 B2
(45) Date of Patent: Nov. 24, 2026

(54) FOOD PRESERVATION METHOD

(71) Applicant: GreenLifeTech Corporation, Banner Elk, NC (US)

(72) Inventors: Bruce B. Roesner, Banner Elk, NC (US); John Freund, Carlsbad, CA (US)

(73) Assignee: GREENLIFETECH Corporation, Banner Elk, NC (US)

( * ) Notice: Subject to any disclaimer, the term of this patent is extended or adjusted under 35 U.S.C. 154(b) by 703 days.

(21) Appl. No.: 17/764,761

(22) PCT Filed: Sep. 30, 2020

(86) PCT No.: PCT/US2020/053592

§ 371 (c)(1),
(2) Date: Mar. 29, 2022

(87) PCT Pub. No.: WO2021/067470

PCT Pub. Date: Apr. 8, 2021

(65) Prior Publication Data

US 2022/0347623 A1 Nov. 3, 2022

Related U.S. Application Data

(60) Provisional application No. 62/907,904, filed on Sep. 30, 2019.

(51) Int. Cl.

| | |
|---|---|
| ***B01D 53/04*** | (2006.01) |
| ***A23B 7/148*** | (2006.01) |
| ***B01D 53/22*** | (2006.01) |

(52) U.S. Cl.
CPC .......... *B01D 53/0446* (2013.01); *A23B 7/148* (2013.01); *B01D 53/0454* (2013.01);
(Continued)

(58) Field of Classification Search
CPC ...................... B01D 53/0446; B01D 53/0454; B01D 53/22; B01D 2253/20; B01D 2257/104;
(Continued)

(56) References Cited

U.S. PATENT DOCUMENTS 4,421,531 A * 12/1983 Dalton, Jr. .............. C01B 23/00 95/138
4,817,391 A * 4/1989 Roe ........................ A23B 7/148 426/418

(Continued)

FOREIGN PATENT DOCUMENTS

CN 101322575 A * 12/2008
CN 101322575 B * 12/2008

(Continued)

OTHER PUBLICATIONS

Machine translation of CN 101322575B (Year: 2008).*

(Continued)

*Primary Examiner* — Dung H Bui
(74) *Attorney, Agent, or Firm* — Fish & Richardson P.C.

(57) ABSTRACT

In some implementations, a system for removing oxygen from a container includes a recirculation pump and an oxygen removal device. The recirculation pump includes an intake and a discharge, and the intake includes a first connector. The discharge is fluidically connected to an oxygen removal device.

11 Claims, 3 Drawing Sheets

(52) U.S. Cl.
CPC .......... *B01D 53/22* (2013.01); *A23V 2002/00* (2013.01); *B01D 2253/20* (2013.01); *B01D 2257/104* (2013.01); *B01D 2259/40088* (2013.01); *B01D 2259/4525* (2013.01); *B01D 2259/804* (2013.01)

(58) Field of Classification Search
CPC .. B01D 2259/40088; B01D 2259/4525; B01D 2259/804; B01D 2259/40083; B01D 53/0407; A23B 7/148; A23V 2002/00
See application file for complete search history.

(56) References Cited

U.S. PATENT DOCUMENTS

| | | | | |
|---|---|---|---|---|
| 4,931,297 | A | 6/1990 | Malyniak et al. | |
| 5,332,547 | A * | 7/1994 | Olson | B01D 53/22 73/19.01 |
| 5,656,068 | A * | 8/1997 | Smolarek | B01D 53/0476 96/144 |
| 5,872,721 | A * | 2/1999 | Huston | A23B 7/148 702/24 |
| 5,925,168 | A * | 7/1999 | Judkins | B01D 53/047 96/108 |
| 6,083,459 | A * | 7/2000 | Mukai | A23L 3/34095 422/1 |
| 6,230,614 | B1 | 5/2001 | Del Gallo et al. | |
| 6,254,763 | B1 * | 7/2001 | Izumi | B01D 53/0407 205/626 |
| 6,557,459 | B1 | 5/2003 | Phelps et al. | |
| 6,607,105 | B2 | 8/2003 | Phelps et al. | |
| 8,205,414 | B2 | 6/2012 | Biotti et al. | |
| 8,240,158 | B2 | 8/2012 | Biotti et al. | |
| 9,237,766 | B2 | 1/2016 | Allard et al. | |
| 2002/0012728 | A1 * | 1/2002 | Carlson | A23B 7/148 426/418 |
| 2005/0142260 | A1 | 6/2005 | Chen et al. | |
| 2005/0268646 | A1 * | 12/2005 | Yuan | A23B 2/721 62/604 |
| 2013/0202755 | A1 * | 8/2013 | Lopez Insausti | A23B 7/154 426/392 |
| 2014/0013950 | A1 * | 1/2014 | Inoue | C01B 13/0248 96/1 |
| 2014/0065274 | A1 | 3/2014 | Bell | |
| 2015/0307217 | A1 * | 10/2015 | Fairbank | A23B 2/708 53/512 |
| 2016/0058040 | A1 * | 3/2016 | Met | A23L 5/36 312/404 |
| 2016/0245555 | A1 * | 8/2016 | Tanaka | B65D 81/266 |
| 2018/0245835 | A1 | 8/2018 | Kamei et al. | |
| 2019/0105595 | A1 * | 4/2019 | Hermans | B01D 53/047 |
| 2019/0141903 | A1 * | 5/2019 | Takayama | F25D 23/00 426/419 |
| 2019/0350230 | A1 * | 11/2019 | Watts | B65B 63/00 |
| 2020/0061529 | A1 * | 2/2020 | Zhu | B01D 53/22 |
| 2020/0140112 | A1 * | 5/2020 | O'Connor | F02C 7/222 |
| 2020/0140113 | A1 * | 5/2020 | Niergarth | F02C 7/22 |
| 2020/0253227 | A1 * | 8/2020 | Kamei | B01D 53/0423 |
| 2021/0023501 | A1 * | 1/2021 | Zhang | B01D 53/0415 |
| 2021/0262207 | A1 * | 8/2021 | Jenkins | E03C 1/02 |
| 2021/0308620 | A1 * | 10/2021 | Cundliffe | B01D 63/06 |

FOREIGN PATENT DOCUMENTS

| | | | | |
|---|---|---|---|---|
| CN | 201199115 | Y | 2/2009 | |
| CN | 101626826 | A | 1/2010 | |
| CN | 101322575 | | 1/2011 | |
| CN | 107250694 | A | 10/2017 | |
| JP | H08294322 | | 11/1996 | |
| JP | 2015054315 | | 3/2015 | |
| JP | 2016164487 | A | 9/2016 | |
| WO | WO-2019065889 | A1 * | 4/2019 | A01F 25/14 |

OTHER PUBLICATIONS

English Translation of CN 101322575A, 36 pages (Year: 2008).*
PCT International Preliminary Report on Patentability in International Appln. No. PCT/US2020/053592, dated Apr. 14, 2022, 10 pages.
PCT International Search Report and Written Opinion in International Appln. No. PCT/US2020/053592, dated Dec. 30, 2020, 11 pages.
Supplementary European Search Report in European Application No. EP 20872629.9, mailed on Oct. 19, 2022, 9 pages.

* cited by examiner

FOOD PRESERVATION METHOD

CROSS-REFERENCE TO RELATED APPLICATIONS

This application claims the benefit of priority to U.S. Provisional Application No. 62/907,904, filed on Sep. 30, 2019, and also claims the benefit of priority to U.S. PCT Application No.: PCT/US2020/053592, filed on Sep. 30, 2020; the entire contents of each and together are incorporated by reference in its entirety.

TECHNICAL FIELD

This invention relates to food preservation.

BACKGROUND

Today there are literally hundreds of patents describing various method or techniques for extending the life of foods and drinks. These patents typically describe three basis techniques or combinations thereof. The intent of just about all of these devices is to reduce the amount of oxygen which makes up 21% of air to which the consumable is exposed. Of course, reducing the temperature, as in refrigeration, slows down the process of bacteria growth and extends the life span of food and drinks, but is not considered is this analysis.

The first technique involves creating a vacuum. In reality, only various degrees of a partial vacuum are created. As the vacuum level is increased (lower pressure), the amount of oxygen available to react with the food or wine is decreased and the life of the material is increased. The challenges associated with this approach are that vacuum systems are expensive, containers to sustain low pressures are expensive, and only a portion of the oxygen is removed providing limited benefits. Even with a high-level vacuum capable of reducing the pressure to 5 psi absolute (approximately one-third of atmospheric pressure), only two-thirds of the oxygen has been removed. In other words, one-third of the oxygen remains.

The second technique, and by far the most popular, is to replace air (21% oxygen) with an inert gas such as nitrogen or argon. The concept around this approach is quite simple. By replacing the air (oxygen) with these inert gases, the amount of oxidation and deterioration of the consumable, is reduced. This technique is used worldwide and does indeed result in the enhanced shelf life of food and wine. Systems that significantly reduce the level of oxygen (0.1 to 1%) have extended the shelf life of wines indefinitely while food has been extended by months. However, there are many issues associated with the technique. The use of inert gas has been found to be a cost-effective means of preserving consumables on a large-scale basis, but most homes and facilities do not have easy access to these types of gases. While there are dedicated businesses already established that bottle and distribute these gases to major consumers of the gases, this method does not lend itself to the typical user because of gas delivery issues as well as the handling of the heavy high-pressure tanks in which the gases are maintained.

Finally the third approach uses chemicals to slow the deterioration of consumables. Needless to say, this is rather risky (possibility of chemicals entering the food chain) and quite costly. Consequently, the method is rarely used beyond well controlled preservatives in food and cosmetics.

SUMMARY

In some implementations, a system for removing oxygen from a container includes a recirculation pump and an oxygen removal device. The recirculation pump includes an intake and a discharge, and the intake includes a first connector. The discharge is fluidically connected to an oxygen removal device.

The system described offers many advantages over previous systems. First, excellent preservation performance as measured in extended shelf life/low oxygen levels is achievable. The performance can be delivered all along the food chain from the farm, through distribution, retail and ultimately home or retail use. This capability can be highly valued in both established as well as emerging markets. Secondly, there are no burdensome gas tanks that continually need to be refilled and/or transported. Thirdly, the final oxygen content of the container can be controlled with no intervention and held to very low levels. Fourthly, the cost can be reasonable. Finally, utilizing oxygen absorbing materials that allows for the discharge of the oxygen back into the environment is politically, commercially and environmentally correct, and very advantageous from a marketing and operational perspective.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
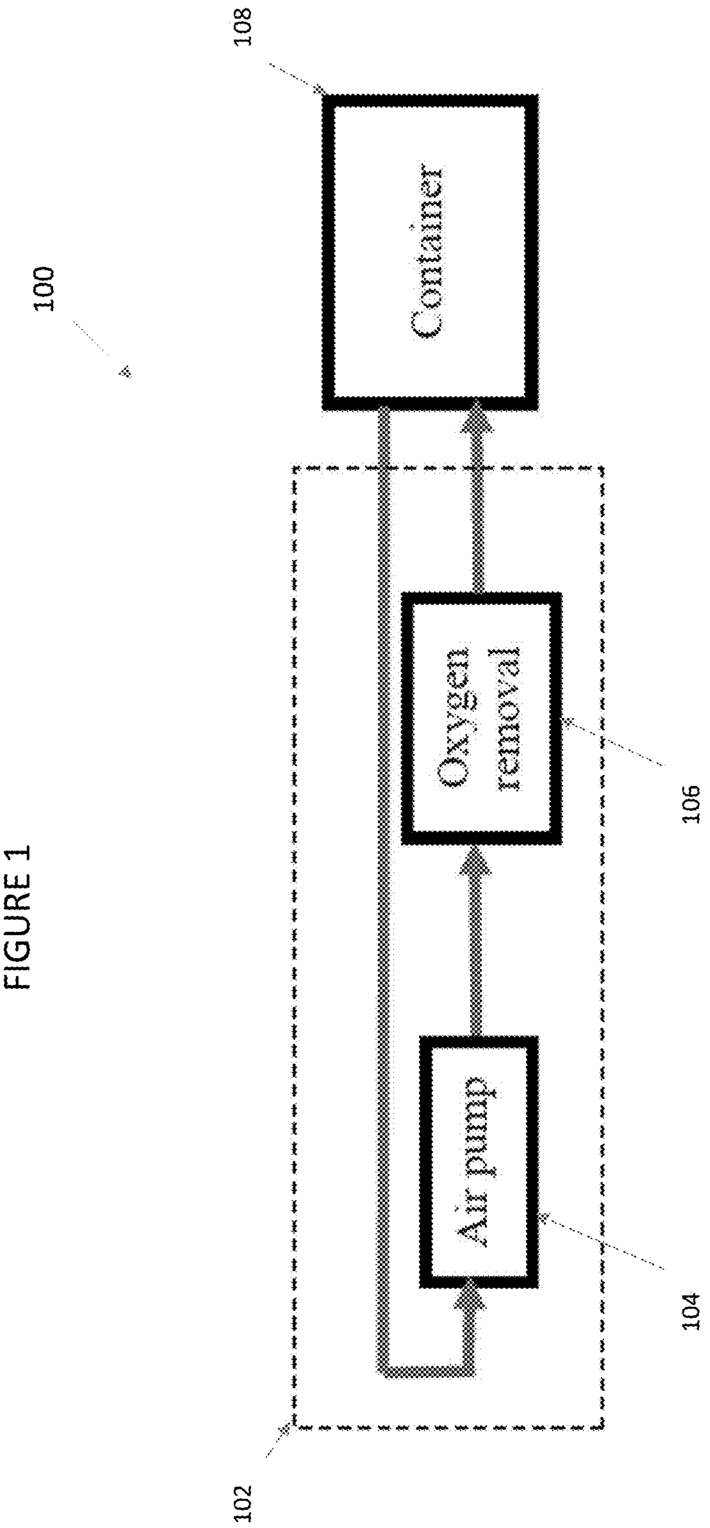
FIG. 1 is an example food preservation system.

FIG. 1 illustrates a food preservation system 100 in accordance with some implementations of the present disclosure. In some implementations, the system 100 can generate a substantially inert gas environment. In these instances, the system 100 can slow the deterioration of the consumables that is not only cost effective but an efficient solution for oxygen removal from food and wine containers. The system 100 can be applied to any items (clothes) adversely affected by the presence of oxygen. A reduced oxygen environment can reduce mold, and its associated smell, and can reduce or eliminate insects from attacking the garment.

Currently, Europe frequently are placed in sealed containers just prior to being fruit ripening. In these instances, the fruit ripens using the trapped oxygen which is depleted, and the fruit then continues to be preserved for months, as long as the container is not opened thereby allowing oxygen to enter. The illustrated system 100 can store ripened fruit and then reduce or remove the oxygen slowing or preventing further ripening and spoilage.

As illustrated, the system 100 includes a circulating system 102 that extracts oxygen from air resulting in an inert gas or substantially inert gas in an atmospheric pressure environment. The circulating systems includes a circulating air pump 104 that includes a canister 106 (oxygen removal device) filled with oxygen reducing material (one time disposable or rechargeable multi use material) from which the oxygen reduced gas is pumped into the enclosed container 108 including, for example, food, bottled goods, clothes, or other items. The gas from the container 108 is then recirculated through the air pump 104 and the oxygen removal process is repeated for the specific container 108. The process can be repeated for other containers.

The system 100 include an oxygen reducing material, other techniques not yet known could be developed in the future and subsequently applied to the proposed system 100. These might be vacuum based or electric field based as examples.

The recirculation can provide multiple advantages. First, the oxygen removal in the container 108 will not be 100% efficient for any practical system. If only a portion of the oxygen is removed as it passes through the container 108, a lower limit of a final oxygen content in the container 108 can be set. As an example, 60% oxygen removal can result in 8% oxygen (40% of the original 20% oxygen content in air) remaining in the container 108. Even if the oxygen removal was 90%, the gas in the container 108 can still have 2% oxygen. But recycling the oxygen deprived gas exiting the container 108 can result in a continually reduced oxygen content. Table 1 is an example that demonstrates the residual oxygen after each cycle.

| % Oxygen | Number of Cycles | | | | |
|---|---|---|---|---|---|
| Removal | 1 | 2 | 3 | 4 | 5 |
| 40 | 12% | 7.20% | 4.32% | 2.59% | 1.56% |
| 50 | 10% | 5.00% | 2.50% | 1.25% | 0.63% |
| 60 | 8% | 3.20% | 1.28% | 0.51% | 0.20% |
| 70 | 6% | 1.80% | 0.54% | 0.16% | 0.05% |
| 80 | 4% | 0.80% | 0.16% | 0.03% | 0.01% |
| 90 | 2% | 0.20% | 0.02% | 0.00% | 0.00% |

Even with an oxygen absorption efficiency of only 70%, the oxygen content in the container can drop below 0.6% in, for example, 3 cycles and below 0.1% in, for example, 5 cycles.

The system 100 can be closed to more efficiently use the oxygen absorbing material. When recycling the gas through the canister 108, less oxygen is typically removed with each cycle. No matter how many times the cycle is performed, the amount of oxygen removed is from the original 20% of the container 108. That said, the container 108 may have insignificant leaks that contribute additional oxygen to the system 100. To be technically accurate, due to pressure equalization (final pressure of container to be approximately atmospheric), the amount of oxygen removed can equal to about 25% of the original volume of air.

In some implementations, the oxygen removal material (ORM) can be rechargeable. In some instances, the ORM can be treated with perhaps heat or UV so that the oxygen is released and then the ORM is reused to remove oxygen again. In these instances, the recharging can occur within the system 100.

Figure 2:
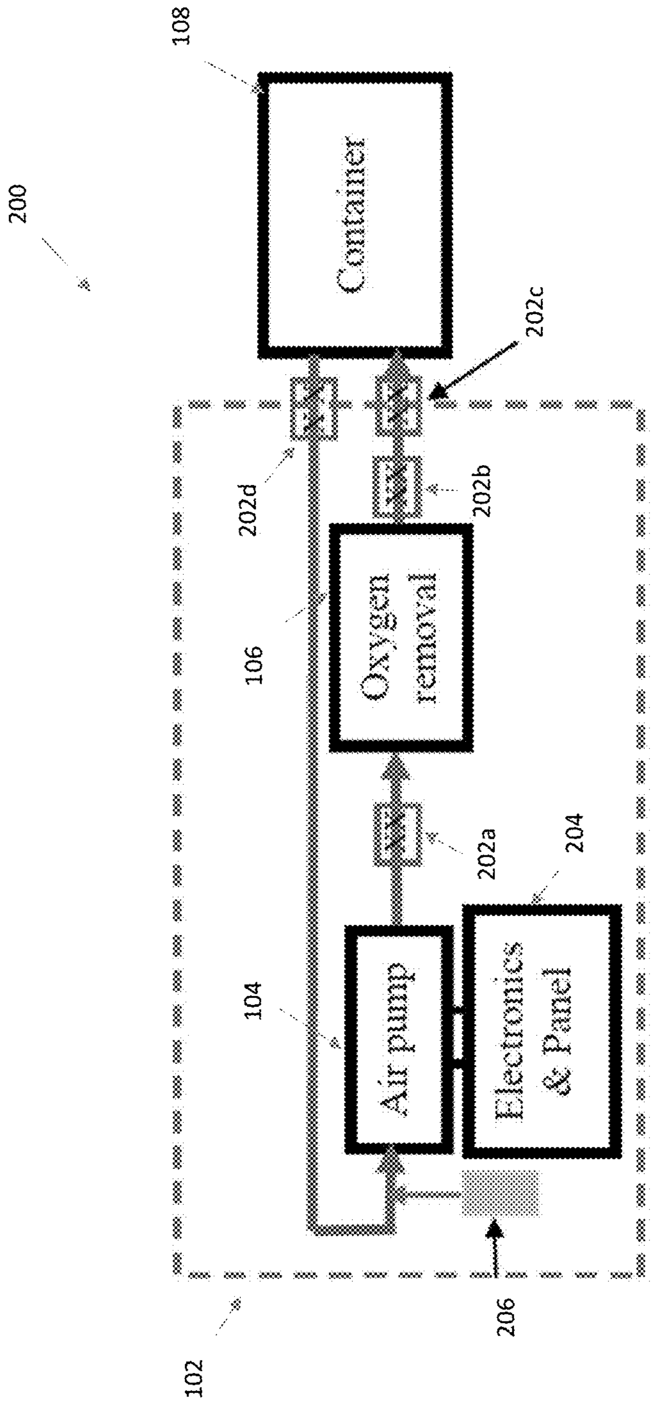
FIG. 2 is another example of a food preservation system.

FIG. 2 is another example food preservation system 200 for automating the preservation method. As illustrated, the system 200 includes locking snap connectors 202*a-d* on the input and output of the container 108. In these instances, the recycling unit 102 can be quickly connected and disconnected to the container 108. The system 200 includes electronics 204 to control the operation (On/Off, timing, etc.) of the pump 104. One-way valves can be used in place of ON/OFF valves or the snap connectors 202 can be also be used. As an example, a one-way valve can be used to allow air into the system 200 as the oxygen is removed. The cost of these items is typically less than $1. The current system 200 includes a low pressure bleeder valve 206.

Proper controls could be implemented in order to optimize performance of the system 200. As an example, the system 200 can be set to run for a given period of time. With different size containers, the operator can select a container size or simply allow the system 200 to run for extended periods of time (e.g., minutes, hours) to most or all the oxygen.

Figure 3:
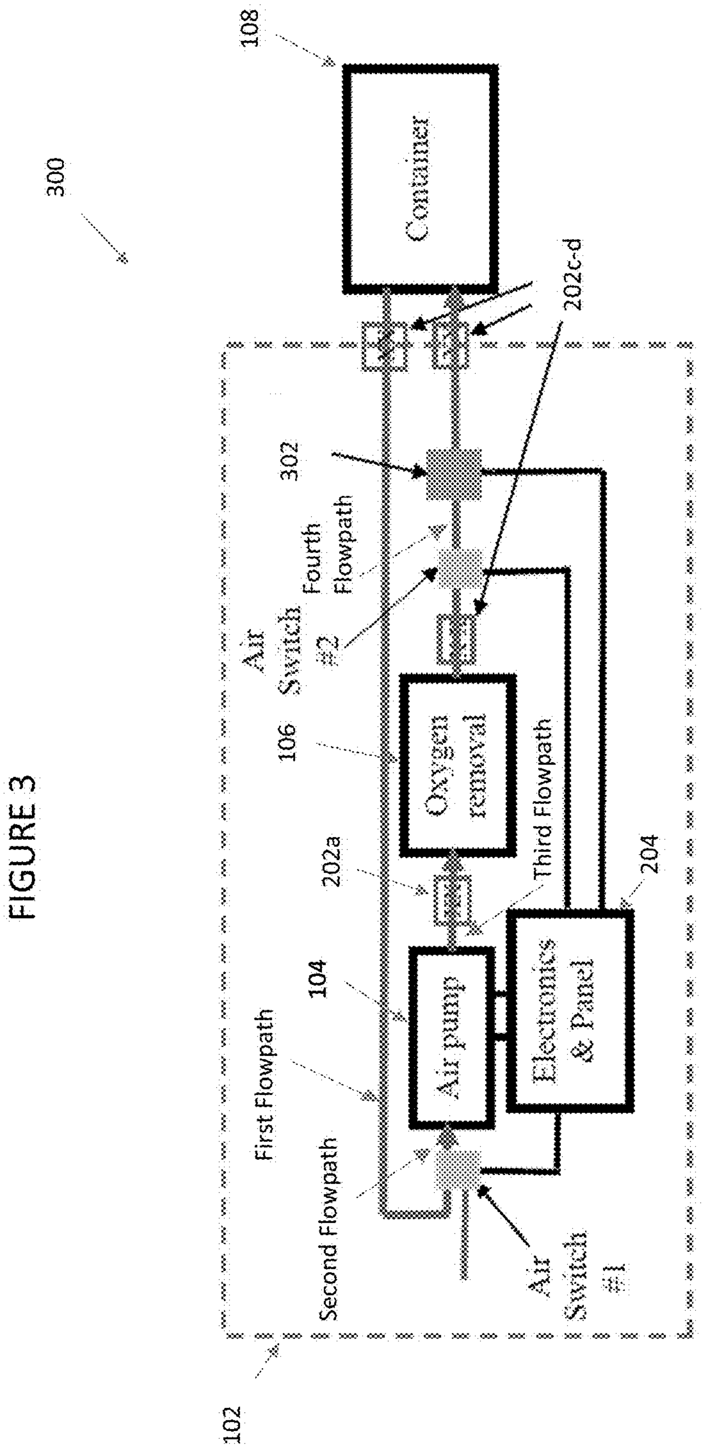
FIG. 3 is another example of a food preservation system.

FIG. 3 illustrates a preservation system 300 in accordance with some implementations with the present disclosure. As illustrated, the system 300 includes an oxygen sensor 302, which then allows the controller to turn off the pump when the oxygen level falls below a certain level.

An indirect and more cost-effective means of monitoring the oxygen level could be through the use of a pressure sensor as the oxygen sensor 302. As the oxygen level is reduced, the pressure inside the closed system/container will be reduced. Monitoring this pressure reduction, as well as the rate change in pressure, allows for an accurate determination of the oxygen content. This technique would circumvent having to know the container volume or the efficiency of the oxygen absorbing material, which could change with usage. A first air switch (Air Switch #1) is fluidically connected to an intake of air pump 104 and connected to electronics 204. A second air switch (Air Switch #2) is fluidically connected between the canister 106 and the oxygen sensor 302. The second air switch is also connected to the electronics 204.

Table 2 is listed below and lists estimates for medium quantities, and based upon the assumption that the material used to extract oxygen from the air will be rechargeable (heat or light used to discharge the oxygen).

| Items | Cost |
|---|---|
| Two lock connectors and stopper | $2.00 |
| Two lock connectors | $1.50 |
| Pump | $6.00 |
| Filter housing | $3.00 |
| Low pressure valve | $0.75 |
| Tubing | $0.50 |
| Housing | $5.00 |
| Electronics/panel | $4.00 |
| Oxygen absorbing material | $6.00 |
| Assembly labor | $2.50 |
| Total | $31.25 |

Although the systems 100-300 has been described as standalone, it should be noted that this could be a subsystem included into other systems. As an example, today's refrigerators have enclosed storage containers to store vegetables, fruits, etc. The proposed systems 100-300 can be built into the refrigerator such that when the containers are opened and subsequently closed, the oxygen reduction recirculating system 102 would be activated either manually or by sensing the closure. As the refrigerator becomes more "intelligent", this subsystem can be built directly into and monitored by the refrigerator.

What is claimed is:

1. A system for removing oxygen from a container, the system comprising:

an air pump comprising an intake and a discharge, wherein the discharge is fluidically connected to an oxygen removal device;

a first flowpath having a first end connected to an inlet of the system and a second end connected to an inlet of a first air switch;

a second flowpath having a first end connected to an outlet of the first air switch and a second end connected to the intake of the air pump;

a third flowpath having a first end connected to the discharge of the air pump and a second end connected to an inlet of the oxygen removal device;

a fourth flowpath having a first end connected to an outlet of the oxygen removal device and a second end connected to an inlet of a second air switch;

a fifth flowpath having a first end connected to an outlet of the second air switch and a second end connected to an outlet of the system;

a one-way valve connected between the first and second end of the third flowpath or connected between the first and second end of the fourth flowpath; and the oxygen removal device comprising:

an inlet of the oxygen removal device fluidically connected to the discharge of the air pump, wherein the inlet comprises a first connector;

an outlet of the oxygen removal device including a second connector; and an oxygen removal portion configured to remove oxygen from fluid passing from the inlet of the oxygen removal device to the outlet of the oxygen removal device.

2. The system of claim 1, wherein the first connector and second connector each comprise snap disconnects that prevent fluid flow when disconnected.

3. The system of claim 1, further comprising a low-pressure bleeder valve fluidically connected to the inlet of the air pump, wherein the low-pressure bleeder valve is configured to introduce additional fluid into the system in response to a pressure in the system being below a predetermined threshold.

4. The system of claim 1, further comprising:

a first valve connected between the first connector and the air pump;

a second valve connected between the second connector and the oxygen removal device;

a pressure sensor configured to sense a pressure in the system and generate a sensed pressure signal; and a controller configured to open and close the first and second valves, and activate the air pump based on a pressure signal from the pressure sensor.

5. The system of claim 1, further comprising:

an oxygen sensor configured to measure an oxygen concentration in the system.

6. The system of claim 1, wherein the oxygen removal device further comprises:

an oxygen release system comprising:

a release path configured to permit fluid flow from the oxygen removal portion of the oxygen removal device out of the system; and an energy source configured to impart energy on the oxygen removal portion of the oxygen removal device sufficient to cause the oxygen removal portion to release scavenged oxygen.

7. The system of claim 6, wherein the energy source is ultraviolet light.

8. The system of claim 6, wherein the energy source is heat.

9. The system of claim 6, wherein the energy source is electric field.

10. The system of claim 6, wherein the energy source is vacuum.

11. The system of claim 1 wherein, the system is integral to a containerized storage device, wherein the containerized storage device comprises one or more containers.

* * * * *